July 29, 1924.  
J. A. VOULGARES  
HAT RENOVATING APPARATUS  
Filed Dec. 17, 1923  
1,503,217  
2 Sheets-Sheet 1

Inventor  
John A. Voulgares  
By  
Attorney

July 29, 1924.

J. A. VOULGARES

HAT RENOVATING APPARATUS

Filed Dec. 17, 1923

Patented July 29, 1924.

1,503,217

UNITED STATES PATENT OFFICE.

JOHN A. VOULGARES, OF CLEVELAND, OHIO.

HAT-RENOVATING APPARATUS.

Application filed December 17, 1923. Serial No. 681,139.

*To all whom it may concern:*

Be it known that I, JOHN A. VOULGARES, a subject of the King of Greece, and a resident of Cleveland, county of Cuyahoga, State of Ohio, have invented certain new and useful Improvements in Hat-Renovating Apparatus, of which the following is a specification.

This invention relates to apparatus for cleaning and finishing hats or similar articles and has for one of its objects the provision of a comparatively simple apparatus that will be convenient to operate, inexpensive to build and will be adjustable to hats of different sizes and kinds.

A further object of the invention is to provide a power operated apparatus which will perform more quickly and more efficiently than the present hand operations of brushing and smoothing the nap of hats that have become soiled through use.

Other objects and the features of novelty will be apparent from the following description, taken in connection with the accompanying drawings, of which:

Figure 1:
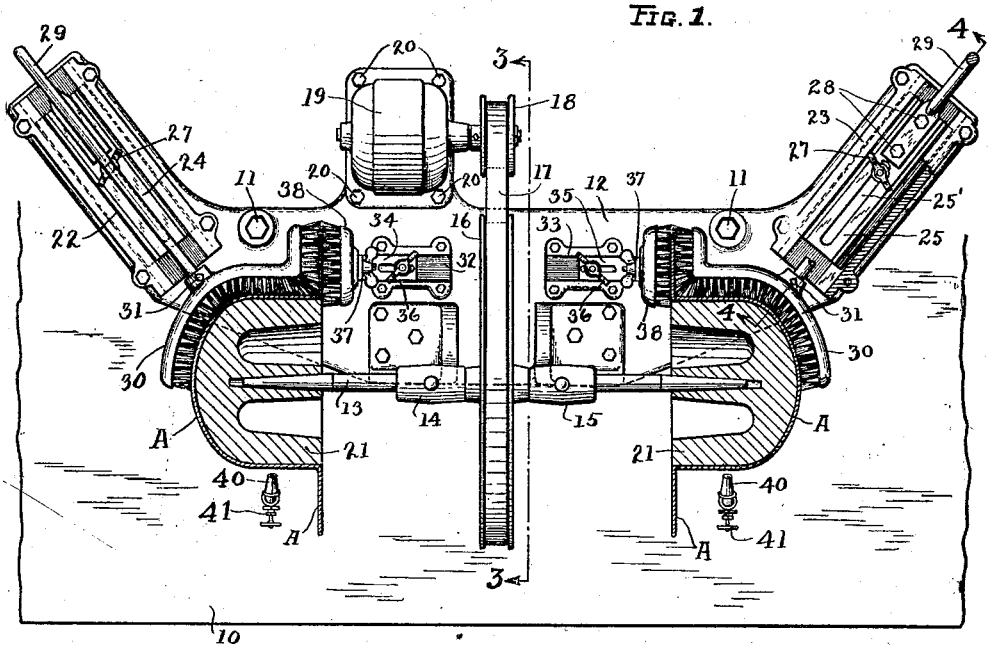
Figure 1 is a plan view of an apparatus embodying my invention, certain parts being shown in section.
Figure 2:
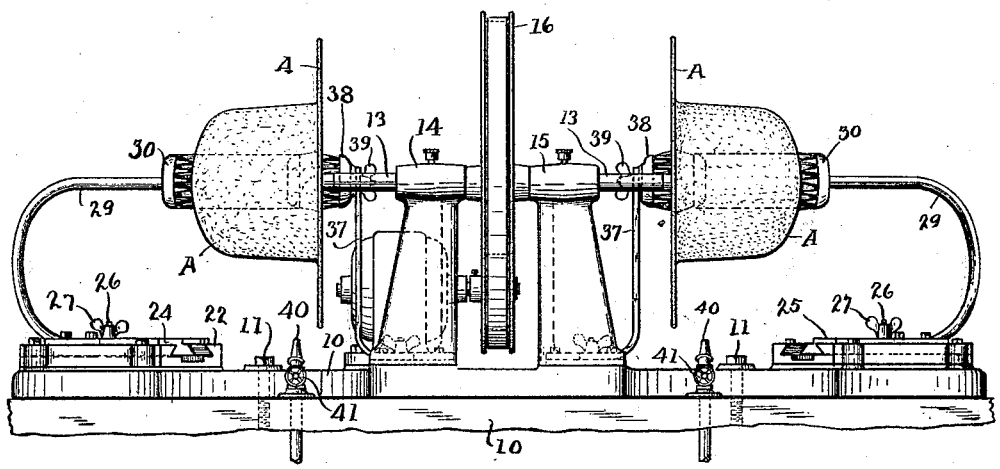
Fig. 2 is a front elevation thereof.
Figure 3:
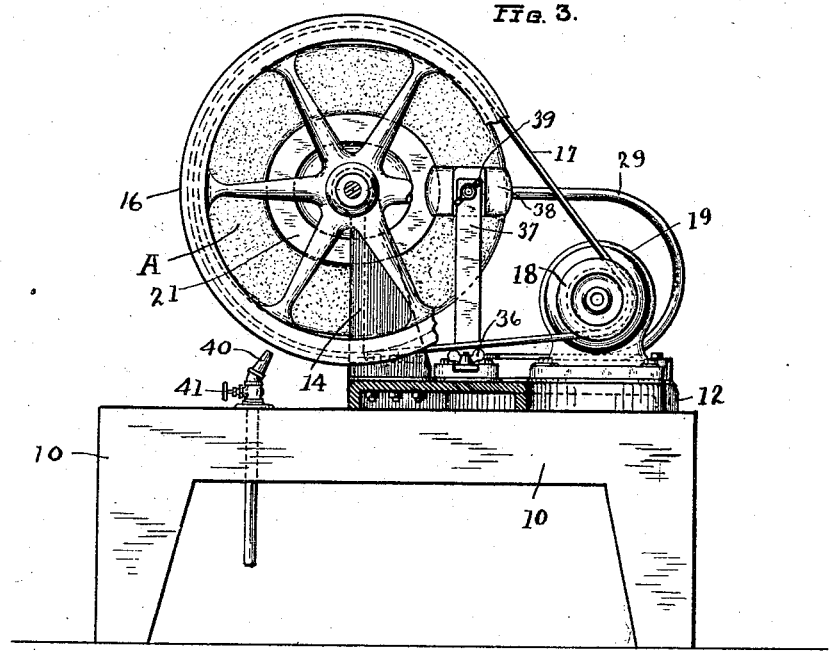
Fig. 3 is a transverse section on the line 3—3 of Fig. 1.

Referring to the drawings, 10 indicates a suitable bench or platform on which there is secured, by means of bolts 11, the base 12 shaped to carry the different parts of the apparatus about to be described. A horizontal shaft 13 is rotatably mounted in the bearing brackets 14 and 15 which are secured to the base 12. Between the bearings 14 and 15, the shaft 13 carries a pulley 16 which is secured to the shaft and is driven by the belt 17 which is operated by the pulley 18 of the motor 19, the latter being secured to the base 12 by the bolts 20.

The ends of the shaft 13 may be tapered, as shown, or otherwise formed to carry the hat forms or blocks 21 and rotate the latter. The base 12 has extensions at its ends for the ways 22 and 23 which, as is clear from Fig. 1, are arranged in converging relation toward the shaft 13. A sliding member 24 is arranged in the ways 22 and a similar member 25 is arranged in the ways 23. The members 24 and 25 are provided with longitudinal slots 25' through which bolts 26 project and these bolts carry wing nuts 27 or equivalent devices for the purpose of clamping the members 24 and 25 in different positions to which they may be adjusted.

Figure 4:
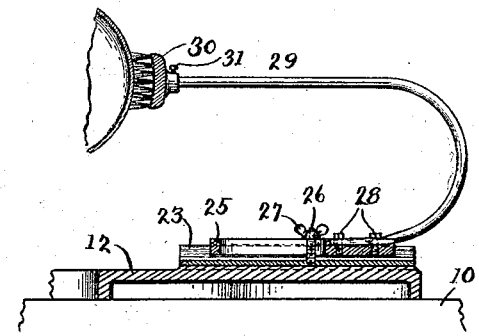
Fig. 4 is a section on the line 4—4 of Fig. 1.

Each of the members 24 and 25 has secured thereon by bolts 28 a flexible rod 29 of spring steel or other flexible material. These rods are preferably bent into the form of a hook, as best shown in Fig. 4, but may be otherwise shaped to provide the requisite flexibility to permit the free ends of the rods to move in every direction.

The free ends of the rods 29 carry the brushes 30 which are preferably shaped to conform to the exterior of a hat on the form 21 so that when the forms are rotated the brushes will operate to clean the hat and also to smooth the nap. The brushes 30 should project slightly beyond the axis of the shaft 13 so as to operate on the entire top surface of the hat and the arrangement of the ways 22 and 23 in angular relation to the axis of the shaft 13, permits the application of the brushes to the hat, throughout the length of the brushes, with the right amount of pressure to produce the best results. The angular arrangement of the ways 22 and 23 also insures that the brushes will not interfere with the putting on or taking off of the hat forms 21, as the members 24 and 25 are moved outward to their extreme positions when this is to be done.

The brushes 30 may be secured on the ends of the rods 29 by set screws 31, or in any other suitable manner, permitting the easy removal and replacement of the brushes or any other device that is to operate on the hat.

The base 12 also carries the relatively small ways 32 and 33 in which the members 34 and 35 slide, these members being clamped in any position by the nuts 36 in the same manner as the members 24 and 25. The slides 34 and 35 carry upright springs 37, to the upper ends of which brushes 38 are adjustably secured by the clamping nuts 39. The brushes 38, as will be best seen from Fig. 1, operate on the underside of the brim of the hat in opposition to the brushes 30, the hats, in Fig. 1, being indicated at A. The adjustment of the slides 34 and 35 permits the application of the brushes 38 to the hats with the desired amount of pressure.

It is usually desirable to provide means for steaming the hats and for this purpose I have shown below each hat a steaming nozzle 40 that is controlled by a valve 41. These nozzles are arranged to direct a jet of steam against the outer surface of the hat while the latter is rotated.

In the operation of the apparatus either one or two hats may be renovated at the same time and since the operations are the same for both I will describe the operations for renovating one. The forms 21, being off the shaft 13, have the hats placed thereon. Assuming that it is desired to use the left half of the apparatus, as seen from Fig. 1, the slide 24 is moved back from the shaft 13 and the form 21, with a hat on it, is then put on the end of the shaft and held there securely enough to permit the shaft to rotate the form. The shaft 13 may be then rotated by hand or otherwise and a suitable cleaning fluid applied to the hat. The slide 24 is then moved to press the brush 30 against the hat and the motor 29 then started. The valve 41 may be opened to apply a jet of steam against the hat and the steam, taken with the cleaning fluid, will permit the brush 30 to clean the outer surface of the hat. The brush 38 may, at the same time, be positioned against the brim and, as will be readily understood, will clean the latter. On account of the oval or irregular shape of the form 21 it is necessary that the brush 30 be free to move to accommodate the wobbling motion of the form and this is provided by the flexibility of the rod 29.

After the hat has been cleaned it is rotated for a short time with the brushes in operative relation thereto for the purpose of smoothing down the nap and I found, in practice, that the apparatus refinishes an old hat so that it looks practically like a new one.

Instead of using the brushes 30 and 38 to clean the hat, the cleaning operation may be performed by means of a cloth held against the hat in any suitable manner while it is rotating. The brushes, however, should be used for smoothing out the nap as they produce the best results.

After the above operations, the hat may be put through the usual operations for shaping the brim and the crown and it will then be finished and ready for use.

Having thus described my invention, what I claim is:

1. In apparatus of the class described, the combination of a base, a shaft rotatably mounted thereon and adapted to carry a hat form, a member slidable on said base to and from said form, a flexible member carried by the first mentioned member, and a brush carried by said flexible member and adapted to operate on a hat carried by said form.

2. In apparatus of the class described, the combination of a base, a shaft rotatably mounted thereon and adapted to carry a hat form, a member slidable on said base at an angle to the axis of said shaft to and from said form, a brush adapted to operate on a hat on said form, and a flexible supporting means for said brush mounted on said member and permitting the brush to yield in every direction relative to the hat.

3. In apparatus of the class described, the combination of a base, a shaft rotatably mounted thereon and adapted to carry a hat form, a member slidable on said base at an angle to the axis of said shaft to and from said form, a brush adapted to operate on a hat on said form, and a flexible rod having one end secured to said member and carrying said brush on its other end and permitting the brush to yield in every direction relative to the hat.

4. In apparatus of the class described, the combination of a base, a shaft rotatably mounted thereon and adapted to carry a hat form, a member slidable on said base to and from said form, means for securing said member in different positions, a brush adapted to conform to the shape of a hat on said form, flexible means on said member for supporting said brush, and an adjustably mounted brush for operating on the brim of the hat in opposition to the first mentioned brush.

5. In apparatus of the class described, the combination of a base, a shaft rotatably mounted thereon and adapted to carry a hat form, ways on said base arranged at an angle to the axis of said shaft, a member slidable in said ways, means for securing said member in different positions, a flexible rod having one end secured on said member and having its other end free to move in any direction, a brush carried by the free end of said rod and adapted to operate on a hat on said form, means for rotating said shaft, and a brush adjustably mounted on said base and adapted to operate on the hat in opposition to the first mentioned brush.

6. In apparatus of the class described, the combination of a base, a shaft rotatably mounted thereon and adapted to carry hat forms on its ends, a plurality of ways on said base arranged in converging relation toward said shaft, members independently slidable in said ways, means for securing said members in different positions, a flexible rod carried by each of said members and each having a free end adapted to move in any direction, brushes carried by the free ends of said rods and adapted to operate on hats on said hat forms, and power means for rotating said shaft.

7. In apparatus of the class described, the combination of a base, a shaft rotatably mounted thereon and adapted to carry hat forms on its ends, a plurality of ways on said base arranged in converging relation toward said shaft, members independently slidable in said ways, means for securing said members in different positions, a flexible rod carried by each of said members and each having a free end adapted to move in any direction, brushes carried by the free ends of said rods and adapted to operate on hats on said hat forms, power means for rotating said shaft, and independent brushes on said base adjustable to operate on the brims of hats on said forms.

In testimony whereof I affix my signature.

JOHN A. VOULGARES.